United States Patent
Liu et al.

(10) Patent No.: US 10,862,321 B2
(45) Date of Patent: Dec. 8, 2020

(54) POWER ADAPTOR, CONTROL METHOD AND DEVICE

(71) Applicant: SHENZHEN LEGENDARY TECHNOLOGY CO., LTD, Guangdong (CN)

(72) Inventors: Xiaoling Liu, Guangdong (CL); Yulong Wang, Guangdong (CN)

(73) Assignee: SHENZHEN LEGENDARY TECHNOLOGY CO., LTD, Guangdong (CN)

( * ) Notice: Subject to any disclaimer, the term of this patent is extended or adjusted under 35 U.S.C. 154(b) by 156 days.

(21) Appl. No.: 16/097,498

(22) PCT Filed: Dec. 1, 2017

(86) PCT No.: PCT/CN2017/114291
§ 371 (c)(1),
(2) Date: Oct. 29, 2018

(87) PCT Pub. No.: WO2018/214459
PCT Pub. Date: Nov. 29, 2018

(65) Prior Publication Data
US 2019/0372366 A1    Dec. 5, 2019

(30) Foreign Application Priority Data
May 26, 2017  (CN) .......................... 2017 1 0383588

(51) Int. Cl.
*H02J 7/00*     (2006.01)
*H01R 31/06*    (2006.01)
*H02J 7/02*     (2016.01)

(52) U.S. Cl.
CPC .......... *H02J 7/0045* (2013.01); *H01R 31/065* (2013.01); *H02J 7/00* (2013.01); *H02J 7/02* (2013.01)

(58) Field of Classification Search
CPC . G06F 1/26; G06F 1/263; G06F 1/266; G06F 1/3203; G05B 15/02; H02J 7/0045;
(Continued)

(56) References Cited

U.S. PATENT DOCUMENTS 5,534,771 A * 7/1996 Massie ...................... G05F 1/44
                                                        323/284
2005/0083615 A1* 4/2005 Rose ...................... H01R 29/00
                                                        361/18
(Continued)

FOREIGN PATENT DOCUMENTS

CN      102306853      1/2012
CN      203813491      9/2014
(Continued)

*Primary Examiner* — Sibin Chen
(74) *Attorney, Agent, or Firm* — Barnes & Thornburg LLP; Jeffrey R. Stone

(57) ABSTRACT

A power adaptor includes a power input interface, a communication protocol chip, a voltage conversion chip and a power output interface; a first detection terminal of the communication protocol chip is connected to the power input interface, a second detection terminal of the communication protocol chip is connected to the power output interface, a control terminal of the communication protocol chip is connected to the voltage conversion chip; and an input terminal of the voltage conversion chip is connected to the power input interface, and an output terminal of the voltage conversion chip is connected to the power output interface.

13 Claims, 7 Drawing Sheets

(58) Field of Classification Search
CPC .. H02J 7/00; H02J 7/02; H01R 31/065; H01R 24/60; H01R 13/6675; H02M 2001/0003; H02M 1/00
See application file for complete search history.

(56) References Cited

U.S. PATENT DOCUMENTS

2011/0121656 A1* 5/2011 Hicks .................. H02J 1/108
 307/80
2017/0293347 A1* 10/2017 Wood, III ........... G06F 13/4282

FOREIGN PATENT DOCUMENTS

| CN | 104281184 | 1/2015 |
| CN | 204231179 | 3/2015 |
| CN | 105826979 | 8/2016 |
| CN | 106972736 | 7/2017 |

* cited by examiner

POWER ADAPTOR, CONTROL METHOD AND DEVICE

CROSS-REFERENCES TO RELATED APPLICATIONS

This application is a national stage application under 35 U.S.C. 371 based on international patent application PCT/CN2017/114291, filed on Dec. 1, 2017 which claims priority to a Chinese patent application No. 201710383588.7 filed on May 26, 2017, disclosures of both of which are incorporated herein by reference in their entireties.

TECHNICAL FIELD

The present disclosure relates to the field of charger technologies, and for example, to a power adaptor, a control method, and a device.

BACKGROUND

With the popularization of a TYPE-C universal serial bus (USB) interface, an adaptor with the TYPE-C USB interface based on USB power delivery (PD) communication protocol is increasingly being used.

An adaptor with a traditional interface will continue to coexist with the TYPE-C USB interface for a period of time. In the case that users do not discard the adaptor with the traditional interface, the traditional power adaptor is needed to be converted into an adaptor based on the USB PD communication protocol, so as to meet the charging requirement of various electronic devices with the TYPE-C USB interface.

However, the ordinary traditional power adaptor cannot be directly converted into the adaptor based on the USB PD communication protocol, thereby resulting in a waste of resources.

SUMMARY

The present disclosure provides a power adaptor, a control method, and a control device, which makes a traditional power adaptor be applicable to various electronic devices with a TYPE-C USB interface based on a USB PD communication protocol, and improves the utilization rate of the traditional power adaptor.

A power adaptor is provided. The power adaptor includes a power input interface, a communication protocol chip, a voltage conversion chip and a power output interface; a first detection terminal of the communication protocol chip is connected to the power input interface, a second detection terminal of the communication protocol chip is connected to the power output interface, and a control terminal of the communication protocol chip is connected to the voltage conversion chip; and an input terminal of the voltage conversion chip is connected to the power input interface, and an output terminal of the voltage conversion chip is connected to the power output interface.

A power adaptor control method is provided. The power adaptor control method includes acquiring, by a communication protocol chip, an input voltage value through a first detection terminal; acquiring, by the communication protocol chip, a target voltage value through a second detection terminal; determining voltage regulation information, by the communication protocol chip, according to the input voltage value and the target voltage value; and performing, by the voltage conversion chip, voltage conversion according to the voltage regulation information so as to make a voltage value of the power output interface consistent with the target voltage value.

A power adaptor control device is provided. The power adaptor control device includes an input voltage acquisition module, which is configured to acquire an input voltage value through a first detection terminal; a target voltage acquisition module, which is configured to acquire a target voltage value through a second detection terminal; a voltage regulation information determination module, which is configured to determine voltage regulation information according to the input voltage value acquired by the input voltage acquisition module and the target voltage value acquired by the target voltage acquisition module; and a voltage regulation information delivery module, which is configured to deliver the voltage regulation information to the voltage conversion chip, so that the voltage conversion chip performs voltage conversion according to the voltage regulation information so as to make a voltage value of the power output interface consistent with the target voltage value.

A computer-readable storage medium, which stores computer-executable instructions, the computer-executable instructions are configured to perform any one of the above methods.

A control device is provided. The control device includes one or more processors, memory, communication protocol chip, voltage conversion chip and a processor, the memory stores program instructions, and one or more programs. The one or more programs are stored in the memory, and when the one or more programs are executed by one or more processors, the power adaptor control method described above is performed.

A computer program product is provided. The computer program product includes computer programs stored in a non-transitory computer-readable storage medium, and the computer programs include program instructions, when the program instructions are executed by a computer, the computer will perform any one of the power adaptor control methods described above.

The power adaptor, the control method, and the control device provided in the embodiment solves the problem that the traditional direct current adaptor (traditional direct current power adaptor) in related arts is not applicable to the TYPE-C USB electronic devices and results in a waste of resources, basing on connection of the power adaptor, so that the same traditional direct current adaptor can complete the tasks of charging various electronic devices, so as to improve the utilization rate of the traditional direct current adaptor.

DETAILED DESCRIPTION

The present disclosure to be described hereinafter in detail combining the drawings and the embodiments.

The First Embodiment

Figure 1A:
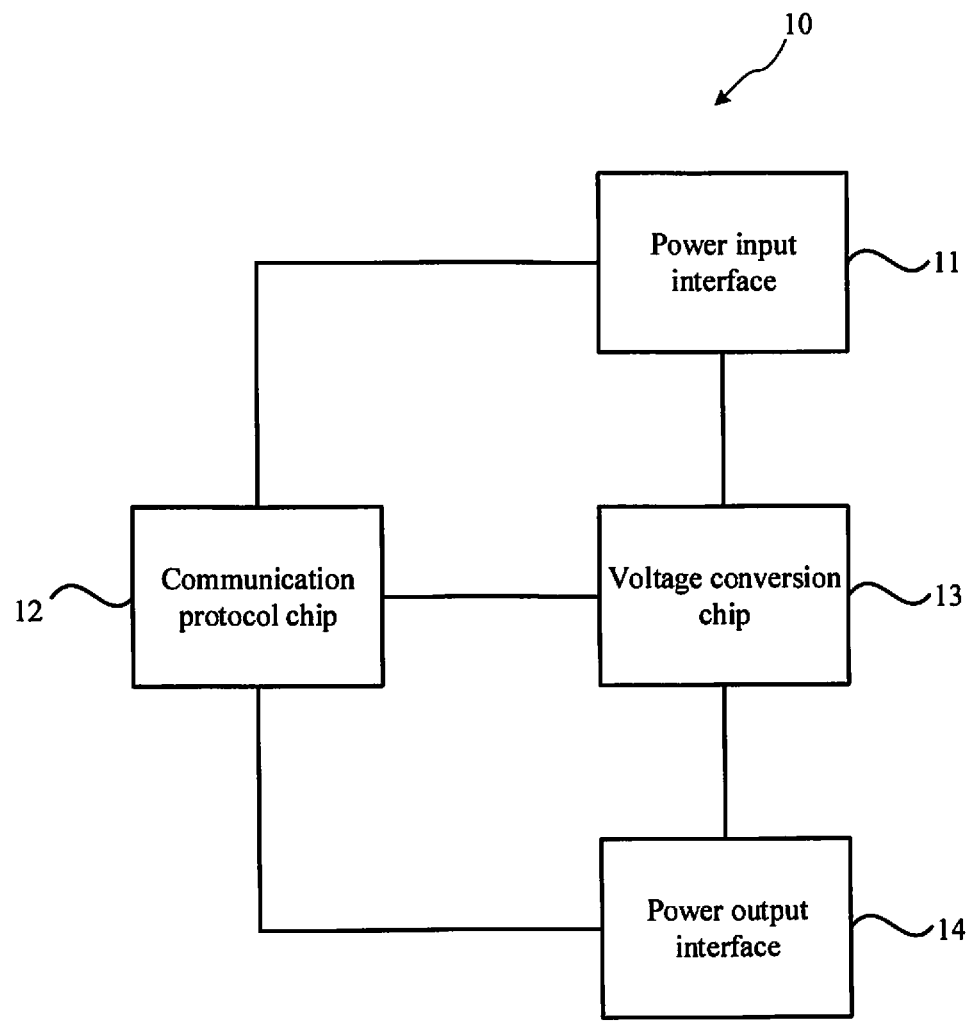
FIG. 1A is a schematic diagram of a power adaptor according to the first embodiment.

FIG. 1A is a schematic diagram of a power adaptor according to a first embodiment. The power adaptor provided in this embodiment is applicable to power adaptors with multiple interfaces and conductors with multiple interfaces, and can be electrically connected to electronic devices with a TYPE-C interface so as to complete charging operation. As shown in FIG. 1A, the power adaptor 10 includes a power input interface 11, a communication protocol chip 12, a voltage conversion chip 13 and a power output interface 14.

A first detection terminal of the communication protocol chip 12 is connected to the power input interface 11, a second detection terminal of the communication protocol chip 12 is connected to the power output interface 14, and a control terminal of the communication protocol chip 12 is connected to the voltage conversion chip 13.

An input terminal of the voltage conversion chip 13 is connected to the power input interface 11, and an output terminal of the voltage conversion chip 13 is connected to the power output interface 14.

The power adaptor 10 is a device connected between a direct current adaptor and an electronic device, enabling a direct current adaptor that does not match with an electronic device to perform charging. The direct current adaptor is a small portable electronic device and a power supply conversion device for the electronic device, and turns the alternating current supplied by a power into direct current which is suitable for the electronic device, for example an adapter for a mobile phone or other mobile devices, or an adaptor for a laptop. Generally speaking, electronic devices brought by users are provided with direct current adaptors. However, adaptors of various kinds of electronic products may be different, which leads to more direct current adaptors should be carried when the users travel, especially for a long time. It is very inconvenient.

There are two constraints that a direct current adaptor cannot match with all kinds of electronic devices. The first is that an interface type of a direct current adaptor does not match with that of the electronic devices, and cannot be connected physically. The second is that power supply parameters of various kinds of electronic devices are different. Even if the interface of direct current adaptor and the interface of electronic device can be physically connected, the electronic device cannot be charged normally. It may take a long time to charge, or may damage the power supply or burn a power supply line due to excessive power supply current. For example, if a tablet's power supply parameters are 5V, 3 A, and the tablet cannot be charged by a mobile phone's direct current adaptor with power supply parameters 3V, 2.5 A.

The power input interface 11 is an interface for being electrically connected to a direct current adaptor, configured to receive input voltage transmitted by the direct current adaptor. There are two ways of physical connection between power input interface 11 and direct current adaptor. When an adaptor head (a charging head) of the direct current adaptor is integrated with an adaptor line (a wire) of the direct current adaptor, the power input interface 11 may be physically connected to the adaptor line, that is, the power output interface 14 is directly physically connected to the electronic device. When the adaptor head and the adaptor line of the direct current adaptor are separated, the power input interface 11 may be physically connected to the adaptor head or the power input interface 11 may be physically connected to the adaptor line. In addition, the interface type of the power input interface 11 may be a USB A interface or a USB B interface.

In this embodiment, the communication protocol chip 12 is a chip that sends a control signal for the conversion of the input voltage of the circuit into a target voltage in accordance with the rules and conventions followed by both parties in completing the communication or service. For example, a communication protocol chip containing USB PD communication protocol, that is, the concept of power transmission based on TYPE-C port, and may realize the function of two-way communication with electronic device. The communication protocol chip 12 may store multiple key-values of "power supply voltage and power supply current" in a preset relational table.

The voltage conversion chip 13 converts the input voltage into the target voltage. In this embodiment, the target voltage is usually the voltage requested by the electronic device. The input voltage is converted into the target voltage, so that the output voltage of the voltage conversion chip 13 may match with the electronic device to complete the charging of the electronic device. The power output interface 14 is an interface electrically connected to the electronic device, configured to output target voltage the electronic device. Similarly, there are two ways of physical connection between the power output interface 14 and the electronic device. When the adaptor head (the charging head) of the direct current adaptor is integrated with adaptor line (the wire) of the direct current adaptor, the power output interface 14 may be directly physically connected to the electronic device. When the adaptor head and the adaptor line of the direct current adaptor are separated, the power output interface 14 may be physically connected to the adaptor line or may be physically connected to the electronic device.

As shown in FIG. 1A, in the power adaptor 10, the first detection terminal of the communication protocol chip 12 is connected to the power input interface 11, the second detection terminal of the communication protocol chip 12 is connected to the power output interface 14, and the control terminal of the communication protocol chip 12 is connected to the voltage conversion chip 13. The input terminal of the voltage conversion chip 13 is connected to the power input interface 11, and the output terminal of the voltage conversion chip 13 is connected to the power output interface 14.

Exemplarily, the power adaptor provided in this embodiment further includes a direct current adaptor, an input terminal of the direct current adaptor is connected to an external power supply, and an output terminal of the direct current adaptor is connected to the power input interface.

Figure 1B:
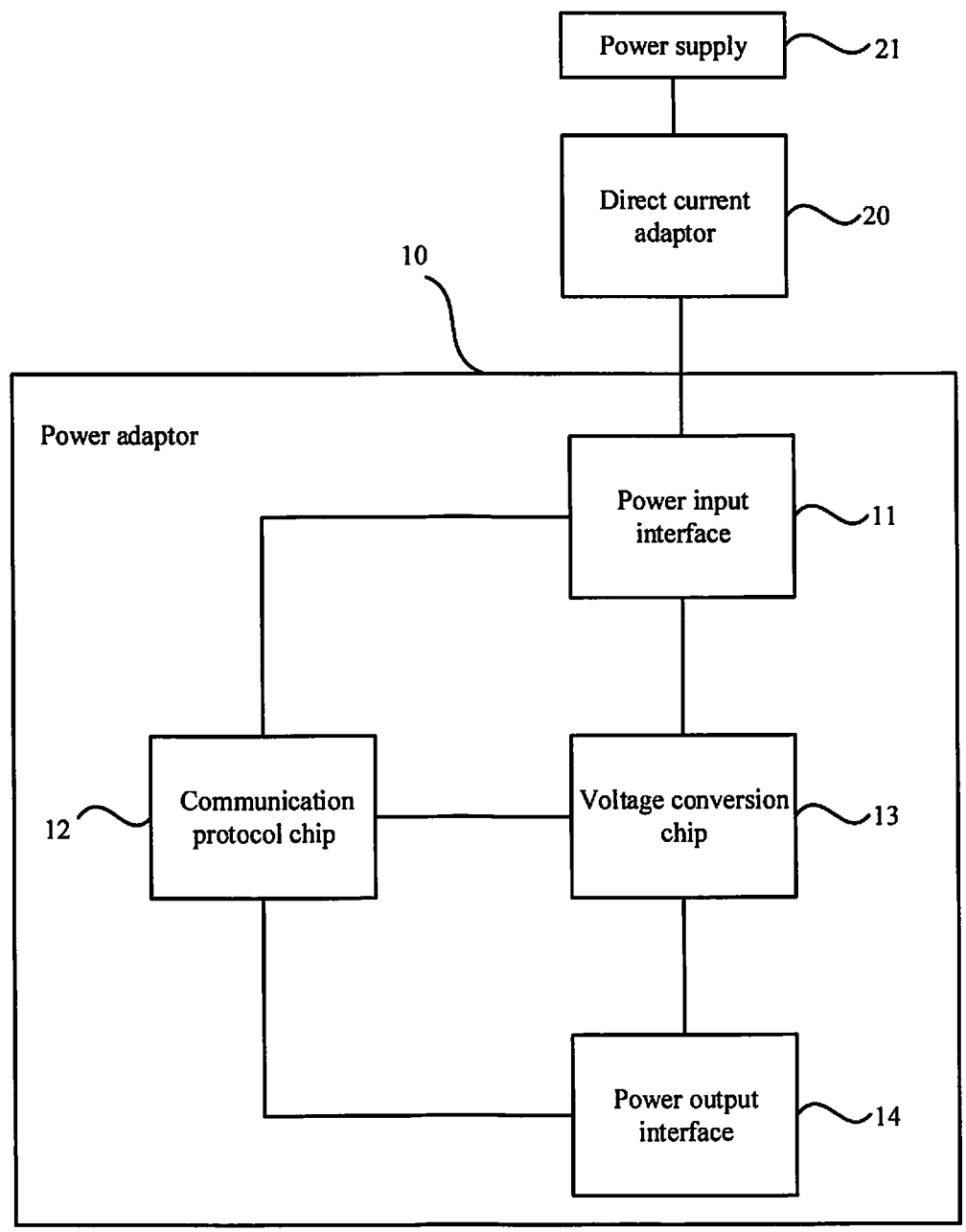
FIG. 1B a schematic diagram of the power adaptor connected to an external power supply according to the first embodiment.

As shown in FIG. 1B, the input terminal of the direct current adaptor 20 is connected to the external power supply 21, and the output terminal of the direct current adaptor 20 is connected to the power input interface 11 to realize the power supply for the electronic device.

Exemplarily, at least one of the power input interface and the power output interface is any one of the following types of interfaces: a plug or a receptacle.

Since the power adaptor 10 is a connection device between the direct current adaptor and the electronic device, and in the power adaptor 10, the type of the power input interface 11 And the type of the power output interface 14 are related to the physical connection position of the power adaptor. When the power adaptor 10 is physically connected to the adaptor head of the direct current adaptor, the power input interface 11 may be set as the plug and the power output interface 14 may be set as the receptacle. When the power adaptor 10 is physically connected to the adaptor line of the direct current adaptor, the power input interface 11 may be set as the receptacle and the power output interface 14 may be set as the plug.

Exemplarily, the power output interface 14 is a USB TYPE-C interface.

Figure 1C:
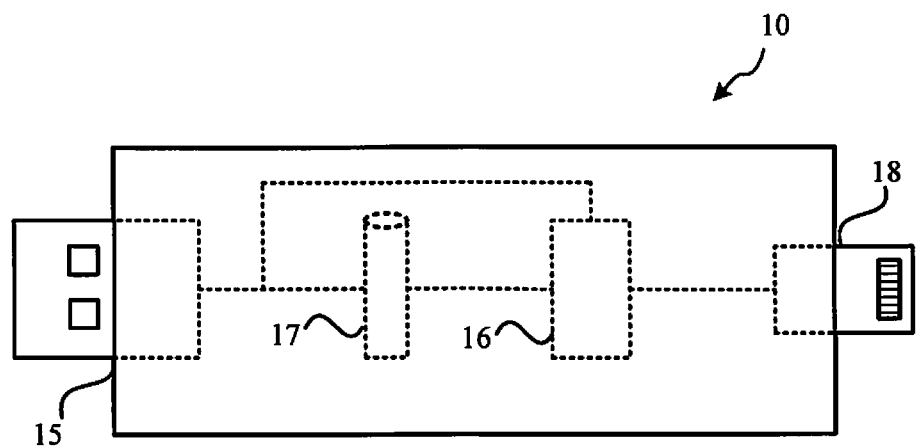
FIG. 1C is a physical diagram of the power adaptor according to the first embodiment.

In the future, the development trend of electronic device interface is to uniformly adopt TYPE-C interface. However, in a period of time when the transformation has not been successful, the traditional direct current adaptor has not completely withdrawn from the market, resulting in the chaotic use of direct current adaptor 20. Therefore, in one or more embodiments, the power output interface 14 is set as a USB TYPE-C interface. The power adaptor 10 is set to be physically connected to the adaptor line of direct current adaptor 20, that is, directly connected to the electronic device, so that the TYPE-C plug interface of the power adaptor 10 may correspond to the TYPE-C receptacle interface of the electronic device Exemplarily, FIG.1C is a physical diagram of the power adaptor 10, 15 is a common USB TYPE-A power input interface, 16 is a PD communication protocol chip, 17 is a voltage conversion chip and 18 is a TYPE-C power output interface.

Figure 1D:
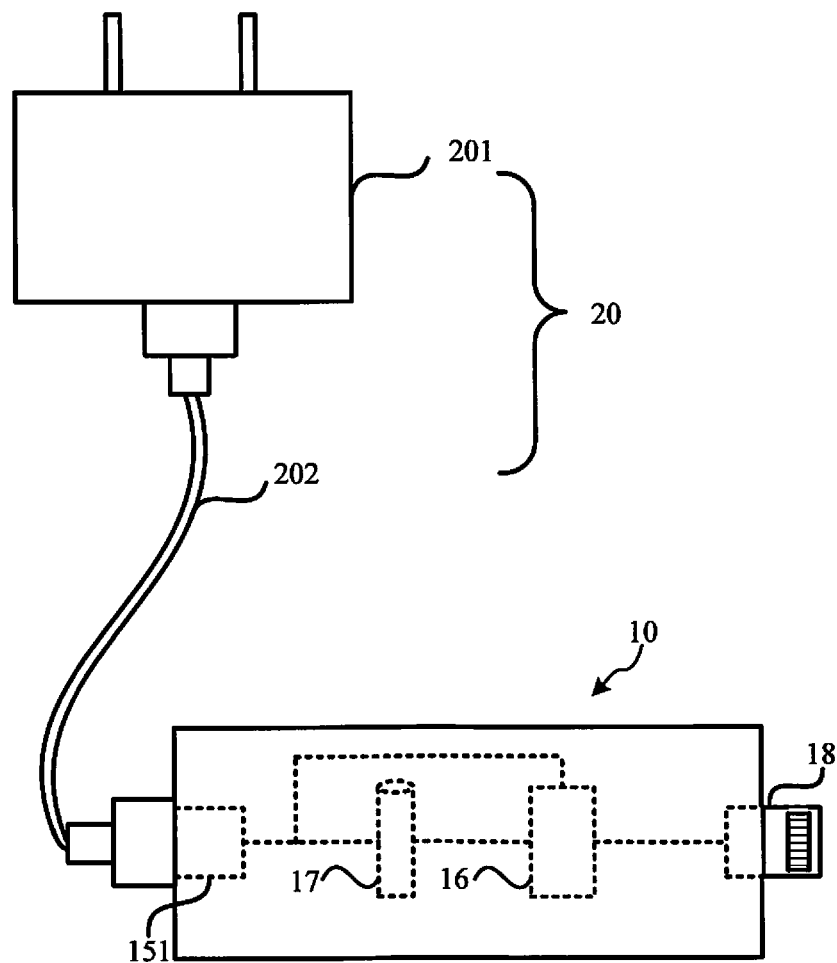
FIG. 1D is a physical diagram of the power adaptor physically connected with a direct current adaptor according to the first embodiment.

Exemplarily, FIG. 1D is a physical diagram of the power adaptor 10 physically is connected to the direct current adaptor 20, 151 is the power input interface of any non-TYPE-C receptacle, 201 is the adaptor head of direct current adaptor 20, and 202 is the adaptor line of direct current adaptor 20. The direct current adaptor 20 is an integrative structure, that is, the adaptor head 201 and the adaptor line 202 cannot be separated, and the interface of the adaptor line 202 is any one of non-TYPE-C plugs. When the adaptor line 202 is powered on, the power input interface 151 of the power adaptor 10 receives voltage transmitted by the direct current adaptor 20, and transmits to the voltage conversion chip 17, the voltage conversion chip 17, according to the requirement of communication protocol chip 16, converts the received power supply voltage into the best applicable voltage to electronic devices, and transmits to electronic device through the power output interface 18. The power adaptor 10 in FIG. 1D enables the direct current adaptor 20 of any non-TYPE-C plug interface to successfully charge for the electronic device with a TYPE-C receptacle interface.

Figure 1E:
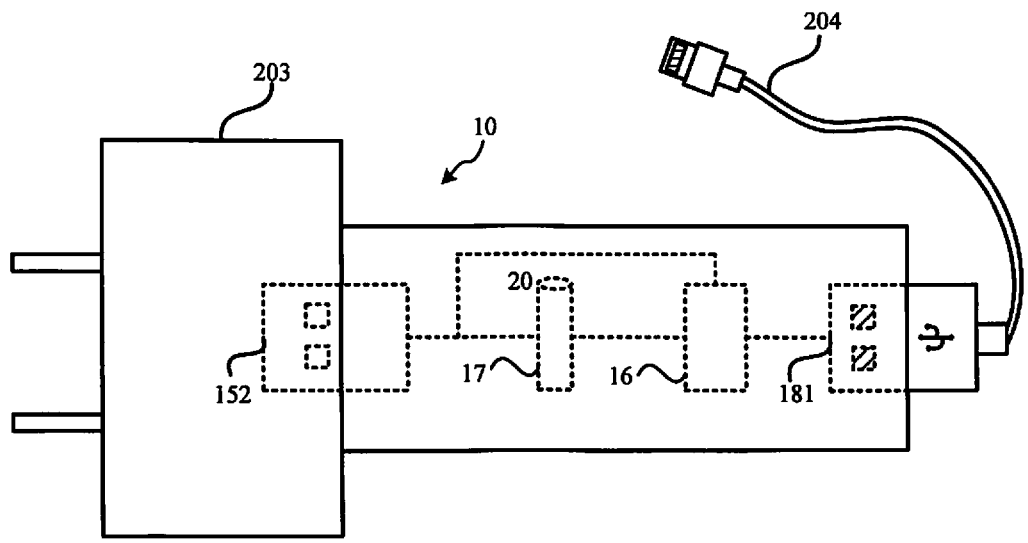
FIG. 1E is another physical diagram of the power adaptor physically connected to a direct current adaptor according to the first embodiment.

Exemplarily, FIG. 1E is another physical diagram of the power adaptor 10 physically is connected to the direct current adaptor, 152 is a USB TYPE-A plug power input interface, 181 is a USB TYPE-A receptacle power output interface, 203 is the adaptor head containing the USB TYPE-A receptacle interface, 204 is the adaptor line containing the USB TYPE-A plug interface. The direct current adaptor is a separate structure, that is, the adaptor head 203 may be separated from the adaptor line 204. Using the power adaptor 10 in FIG. 1E and arranging the power adaptor 10 between the adaptor head 203 and the adaptor line 204, the direct current adaptor may charge more electronic devices with similar interfaces and different power supply parameters.

The type of power input interface and power output interface of the foregoing power adaptors not only includes the interfaces described in this embodiment, but also applies to other types of interfaces.

This embodiment provides a power adaptor, basing on a power input interface, a communication protocol chip, a voltage conversion chip and a power output interface, realizes that a power adaptor supply for various electronic devices that not match with the power adaptor, and solves the problem that the power adaptor in related arts is not applicable to the TYPE-C USB electronic devices and results in a waste of resources. It is convenient for users to carry a same traditional direct current adaptor when traveling to complete charging tasks of various electronic devices and improve the utilization rate of the traditional direct current adaptor.

The Second Embodiment

Figure 2:
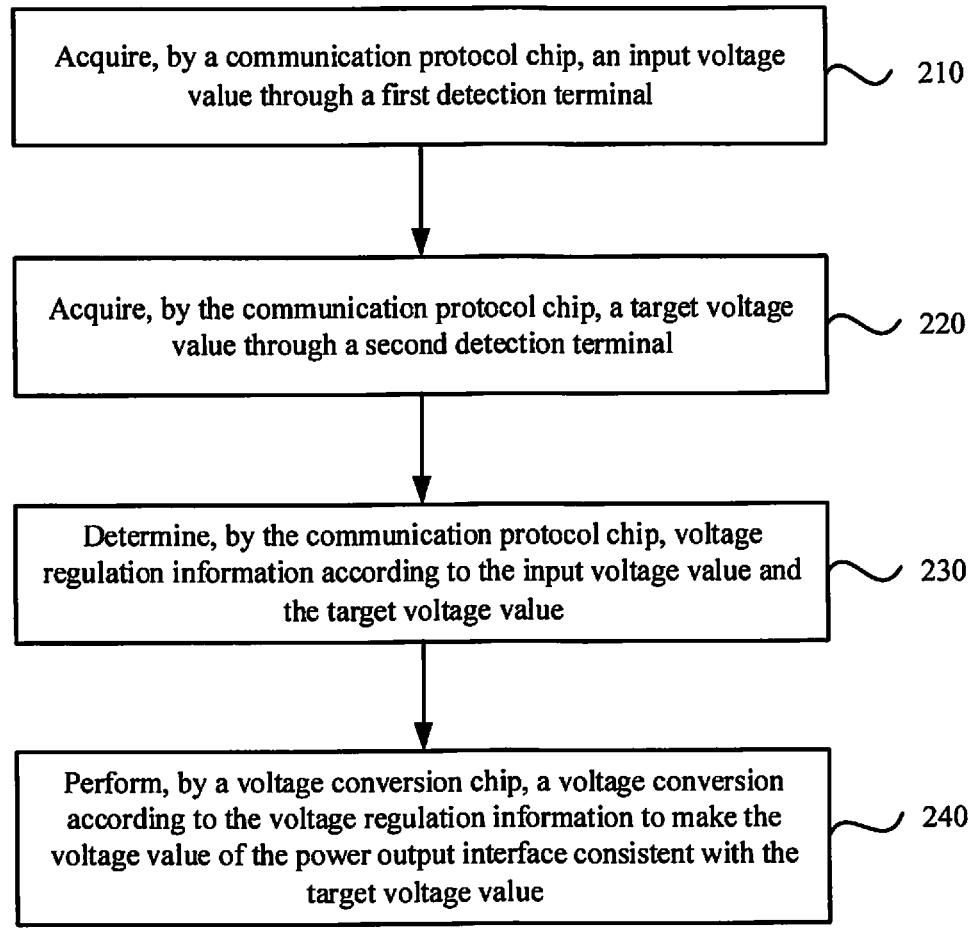
FIG. 2 is a flowchart of a power adaptor control method according to the second embodiment.

FIG. 2 is a flowchart of a power adaptor control method according to the second embodiment. This embodiment may be applicable to the condition of controlling the power adaptor. The method may be performed by a power adaptor control device provided in this embodiment. The device may be implemented by software and/or hardware, and the device may be integrated in the device providing the control function of the power adaptor. As shown in FIG. 2, the method for controlling the power adaptor includes the following steps.

In step 210, a communication protocol chip acquires an input voltage value through a first detection terminal.

Alternatively, the power adaptor includes a power input interface, a communication protocol chip, a voltage conversion chip and a power output interface. The communication protocol chip includes a first detection terminal, a second detection terminal and a control terminal. The first detection terminal is connected to the power input interface of the power adaptor, the second detection terminal is connected to the power output interface, and the control terminal is connected to the voltage conversion chip.

The communication protocol chip acquires an input voltage value at the power input interface through a first detection terminal, and the voltage value is provided by a direct current adaptor electrically connected to the power adaptor. As the direct current adaptor has the function of converting alternating current from external power to direct current, the input voltage acquired by the communication protocol chip at the first detection terminal is direct current voltage value.

In step 220, the communication protocol chip acquires a target voltage value through a second detection terminal.

Alternatively, the second detection terminal of the communication protocol chip electrically is connected to the power output interface of the power adaptor. The power output interface electrically is connected to the electronic device. As the communication protocol chip has intercommunication function with the electronic device, when the electronic device is connected to the external power supply through the power adaptor, the electronic device may provide its best power supply parameters (the target voltage value and/or a target current value) to the communication protocol chip to meet the power supply demand.

In step 230, the communication protocol chip determines voltage regulation information according to the input voltage value and the target voltage value.

Alternatively, as the target voltage values of various electronic devices are different, the power supply voltage of direct current adaptor cannot be determined whether it matches with the connected electronic device. Therefore, the communication protocol chip acquires the voltage regulation information according to the target voltage value requested by the electronic device and the input voltage value acquired through the power input interface. When the target voltage value requested by the electronic device is equal to the input voltage value acquired through the power input interface, the final voltage regulation information determined by the communication protocol chip is not to deal with the input voltage value. When the target voltage value requested by the electronic device is not equal to the input voltage value acquired through the power input interface, the communication protocol chip determines the voltage regulation information that can make the input voltage convert into the target voltage requested by the electronic device. The voltage regulation information is a signal which can be recognized by the voltage conversion chip, and a parameter set for the voltage conversion chip to adjust the circuit.

For example, assumes that the input voltage value acquired by the first detection terminal of the communication protocol chip through the power input interface is 7V, the target voltage value acquired by the second detection terminal through the power output interface is 5V, as the target voltage value requested by the electronic device is not equal to the input voltage value of the power input interface. The communication protocol chip determines the voltage regulation information of how to convert 7V voltage value into 5V voltage value, and send the voltage regulation information to the voltage conversion chip, as control signal for the voltage conversion chip to convert voltages.

In step 240, the voltage conversion chip performs voltage conversion to make the voltage value of the power output interface consistent with the target voltage value according to the voltage regulation information.

After the voltage conversion chip receives the voltage regulation information sent by the communication protocol chip, the voltage conversion chip converts the input voltage value of the power input interface into the target voltage value requested by the electronic device according to the voltage regulation information, so that the voltage value of the power output interface of the power adaptor is consistent with the target voltage value requested by the electronic device. The voltage conversion chip transmits the converted target voltage to the power output interface of the power adaptor, and the power output interface provides the converted target voltage to the electronic device.

For example, after receiving the foregoing voltage regulation information that converts 7V voltage value to 5V voltage value, the voltage conversion chip converts the input voltage value 7V of the power input interface to the target voltage value 5V requested by the electronic device.

Exemplarily, the voltage conversion chip conducts voltage conversion according to the voltage regulation information, including: the voltage conversion chip adjusts a resistance value of an internal circuit of the voltage conversion chip, or adjusts the internal circuit of the voltage conversion chip through a preset communication protocol.

Alternatively, the voltage conversion chip may adjust the resistance value of the internal circuit to convert the input voltage value of the power input interface into the target voltage requested by the electronic device. The voltage conversion chip may also adjust the internal circuit of the voltage conversion chip through the preset communication protocol. The preset communication protocol is a preset protocol to adjust the internal circuit of the voltage conversion chip, through which the target voltage of the electronic device can be obtained, for example, inter-integrated circuit (IIC) communication protocol.

In the method for controlling the power adaptor provided by this embodiment, the communication protocol chip determines the voltage regulation information according to the detected target voltage value and the input voltage value, and the voltage conversion chip performs voltage conversion according to the voltage regulation information to make the voltage value of the power output interface consistent with the target voltage value, realizing that a power adaptor can supply power for various electronic devices that do not match with the power adaptor, to maximize the utilization rate of the direct current adaptor.

The Third Embodiment

Figure 3:
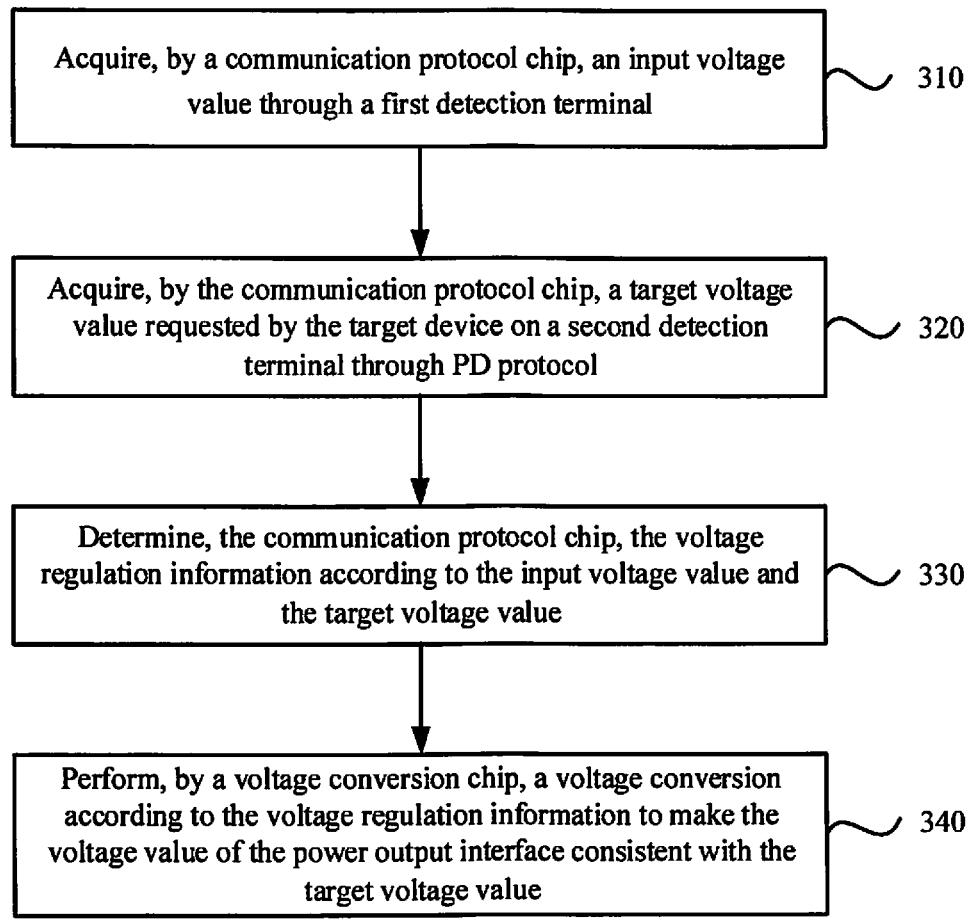
FIG. 3 is a flowchart of a power adaptor control method according to the third embodiment.

FIG. 3 is a flowchart of a power adaptor control method according to the third embodiment. On the basis of foregoing embodiments, the communication protocol chip acquires the target voltage value through the second detection terminal includes the communication protocol chip acquires the target voltage value requested by the target device on the second detection terminal through a PD protocol.

As shown in FIG. 3, the method provided in this embodiment includes the following steps.

In step 310, a communication protocol chip acquires an input voltage value through a first detection terminal.

In step 320, the communication protocol chip acquires a target voltage value requested by the target device on a second detection terminal through a PD protocol.

The target device is an electronic device that is electrically connected to a power adaptor. The PD protocol is a power transmission concept proposed after TYPE-C port, which can realize the function of two-way communication with electronic device. The second detection terminal of the communication protocol chip is connected to the power output interface, and the power output interface is connected to the target device, so that when the second detection terminal of the communication protocol chip is connected to the power output interface, the target voltage value requested by the target device may be acquired.

Exemplarily, after the step of acquiring the target voltage value requested by the target device through PD protocol, the method further includes: the target current value requested by the target device is acquired; a first current value corresponding to the target voltage value according to a preset relational table is acquired; and if the target current value is larger than the first current value, the first current value is taken as the current value requested by the target device.

In this embodiment, the target current value is the specified current value of the target device, and the preset relational table is the reference value stored in PD protocol chip source capability package. Generally speaking, the preset relational table in the PD protocol chip may contain 7 levels of key-value pairs of voltage value and current value, and the voltage value of each level corresponds to a current value of the respective one of the levels one by one. The 7 levels of the voltage value and the current value contained in the preset relational table is enough to meet the requirements of various of small mobile electronic devices, that is, regarding the target voltage value requested by the target device, the PD protocol chip may control the voltage conversion chip convert the input voltage value acquired at the first detection terminal into the target voltage value required by the target device. However, the target current value is not so easily solved as the target voltage value can be achieved after the conversion.

As both the direct current adaptor and the voltage conversion chip have specified current, when a overcurrent value is larger than the specified current value, the equipment will be damaged, so the target current value required by the target device should to be less than the specified current value of the direct current adaptor and the specified current value of the voltage conversion chip.

Alternatively, after obtaining the target voltage value and the target current value requested by the target device, the communication PD protocol chip determines a voltage level that is the same as the target voltage value in the preset relational table, acquires a first current value corresponding to the voltage level, compares the target current value with the first current value. When the target current value is larger than the first current value, the first current value is taken as the current requested by the target device and is transmitted to the target device (that is, update the target current value requested by the target device).

In step 330, the communication protocol chip determines the voltage regulation information according to the input voltage value and the target voltage value.

In step 340, the voltage conversion chip performs voltage conversion to make a voltage value of the power output interface match with the target voltage value according to the voltage regulation information.

The method provided in this embodiment is applicable in the condition that the target current value requested by the target device is less than the specified current of the direct current adaptor, and is larger than the first current value corresponding to the target voltage value in the PD protocol chip.

In this embodiment, PD protocol chip acquires the target voltage value and the target current value requested by the target device, compares the first current value corresponding to the target voltage and stored in the PD protocol chip with the target current value, gets final voltage value and final current value of the target device, and supplies them to the target device for charging, thereby avoiding damage of device due to excessive current.

The Fourth Embodiment

Figure 4:
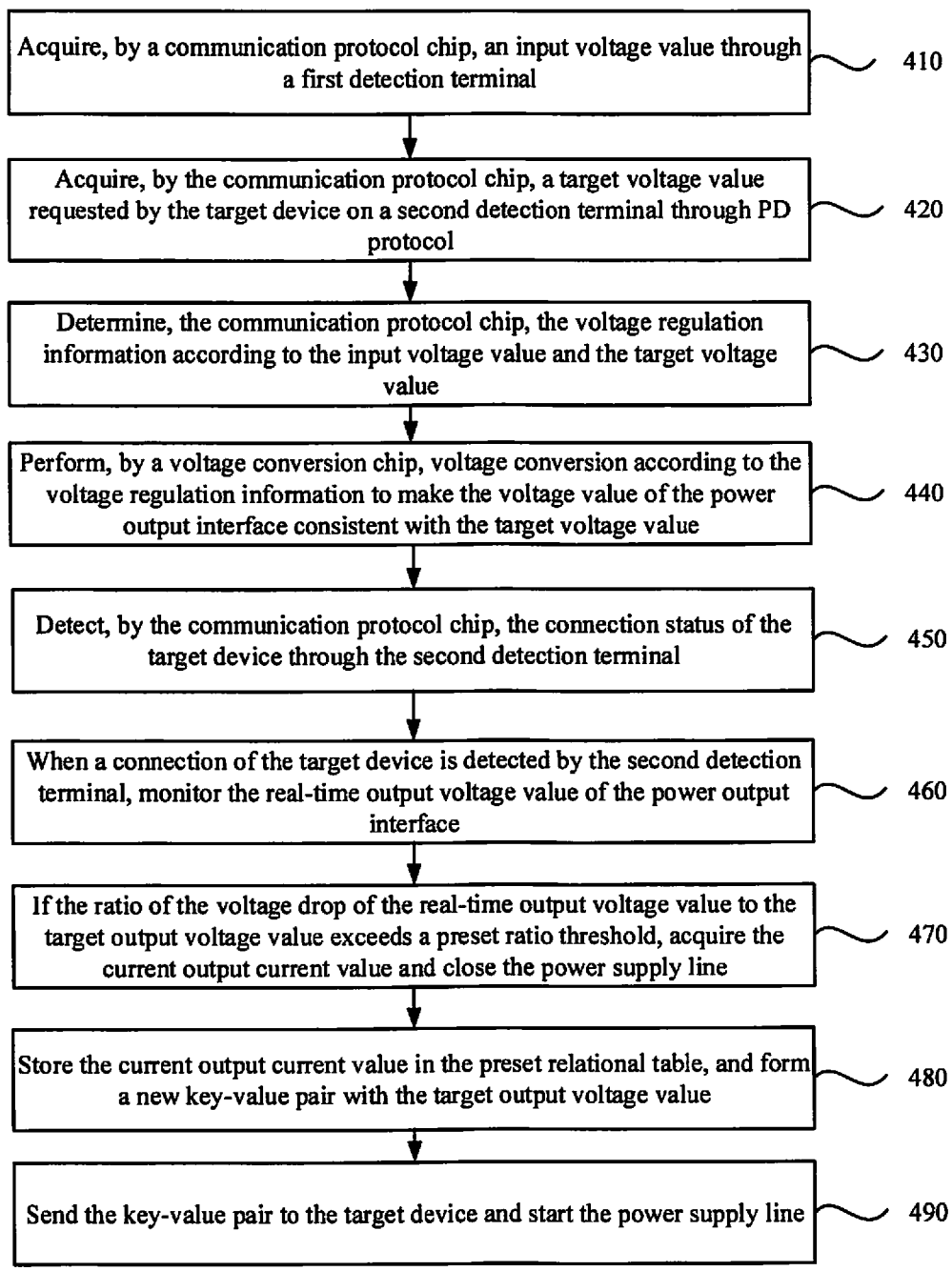
FIG. 4 is a flowchart of a power adaptor control method according to the fourth embodiment.

FIG. 4 is a flowchart of a power adaptor control method according to the fourth embodiment. On the basis of foregoing embodiments, this embodiment further includes the following steps. The communication protocol chip detects the connection status of the target device through the second detection terminal. When a connection of the target device is detected by the second detection terminal, the real-time output voltage value of the power output interface is monitored. If the ratio of the voltage drop of the real-time output voltage value to the target output voltage value exceeds a preset ratio threshold, the current output current value is acquired, and the power supply is closed; a key-value pair of the current output current value and the real-time output voltage value is stored in the preset relational table; and the key-value pair is sent to the target device and the power supply is started.

As shown in FIG. 4, the method in this embodiment may include the following steps.

In step 410, a communication protocol chip acquires an input voltage value through a first detection terminal.

In step 420, the communication protocol chip acquires a target voltage value requested by the target device on a second detection terminal through a PD protocol.

In step 430, the communication protocol chip determines the voltage regulation information according to the input voltage value and the target voltage value.

In step 440, the voltage conversion chip performs voltage conversion to make the voltage value of the power output interface match with the target voltage value according to the voltage regulation information.

In step 450, the communication protocol chip detects the connection status of the target device through the second detection terminal.

Alternatively, the second detection terminal of the communication protocol chip is connected to the power output interface, and thus the connection status of the target device can be detected. When the power adaptor is connected to the direct current adaptor, the external power supply is connected, and no target device is connected, the voltage detected by the second detection terminal of the communication protocol chip is a constant value, and the voltage value does not change. The measured voltage value changes when the target device is connected.

In step 460, when a connection of the target device is detected by the second detection terminal, the real-time output voltage value of the power output interface is monitored.

The second detection terminal of the communication protocol chip continuously monitors the power output interface. When the acquired voltage value changes, it can be confirmed that the second detection terminal detects the connection of the target device and obtain the real-time output voltage value of the power output interface.

Alternatively, the second detection terminal of the communication protocol chip continuously monitors the real-time output voltage of the power output interface without judging whether the target device exists.

In step 470, if the ratio of the voltage drop of the real-time output voltage value to the target output voltage value exceeds a preset ratio threshold, the current output current value is acquired and the power supply is closed.

The preset ratio threshold is a dynamic value set according to experience, which is generally set as 20%. That is, if the ratio between the voltage drop of the real-time output voltage value and the target output voltage value exceeds 20%, the current output value is obtained and the power supply is closed.

Alternatively, the communication protocol chip acquires the target voltage value requested by the target device, matches the target voltage value with the voltage stored in the preset relational table, and control the voltage conversion chip adjust the input voltage value to provide the target voltage value requested by an output target device. The voltage conversion chip outputs the converted target voltage value to the power output interface as the target output voltage value of the target device. However, as the current requested by the target device exceeds the specified current of the direct current adaptor, the real-time output voltage value acquired by the second detection terminal of the communication protocol chip may continue to decrease. When the voltage drop of the real-time output voltage and the target output voltage exceed the preset ratio threshold, in order to prevent the direct current adaptor from being burned out, the power line (VBUS) is turn off to protect the circuit and the current output current value is acquired.

In step 480, the current output current value is stored in the preset relational table, and a new key-value pair of the current output current value and the target output voltage value is formed.

Alternatively, with the decrease of real-time output voltage value, the output current value increases. In actual operation, the real-time output current value when the ratio between the voltage drop of the real-time output voltage value and the target output voltage value exceeds 20% is taken as the maximum current value that the direct current adaptor can withstand. Therefore, the current output current value is stored in the preset relational table, which matches with the voltage level and a new key-value pair of the current output current value and the target output voltage (the target voltage) is formed.

Since there are 7 levels of the voltage value and the current value are stored in key-value pairs in the preset relational table in the PD communication protocol chip, the process of storing the current output current value in the preset relational table is equivalent to updating a original current value corresponding to a corresponding voltage level in a original preset relational table.

In step 490, the key-value pair is sent to the target device and the power supply is started.

Alternatively, the communication protocol chip sends the updated key-value pair to the target device, so that the target device will request the updated key-value pair as a new power supply parameter. In addition, the power line for power supply is started.

The method provided in this embodiment is applicable in a condition that the target current value requested by the target device is less than the first current value corresponding to the target voltage value in the PD protocol chip, but larger than the specified current of the direct current adaptor.

Alternatively, when the target current value requested by the target device is larger than the first current value corresponding to the target voltage value in the PD protocol chip, and larger than the specified current of the direct current adaptor, the smaller current value should be acquired and processed in different cases.

In the power adaptor device control method provided in this embodiment, when the second detection terminal of the communication protocol chip monitors the ratio of the real-time output voltage value drop and the target output voltage value exceeds the preset threshold, the current output current value is acquired as a current value corresponding to the target value in a new preset relationship table, as new power supply parameters requested by the target device, enables that the traditional power adaptor can be applied to a multiple of electronic devices with a TYPE-C USB interface based on USB PD communication protocol, thereby improving the utilization rate of power adaptor.

The Fifth Embodiment

Figure 5:
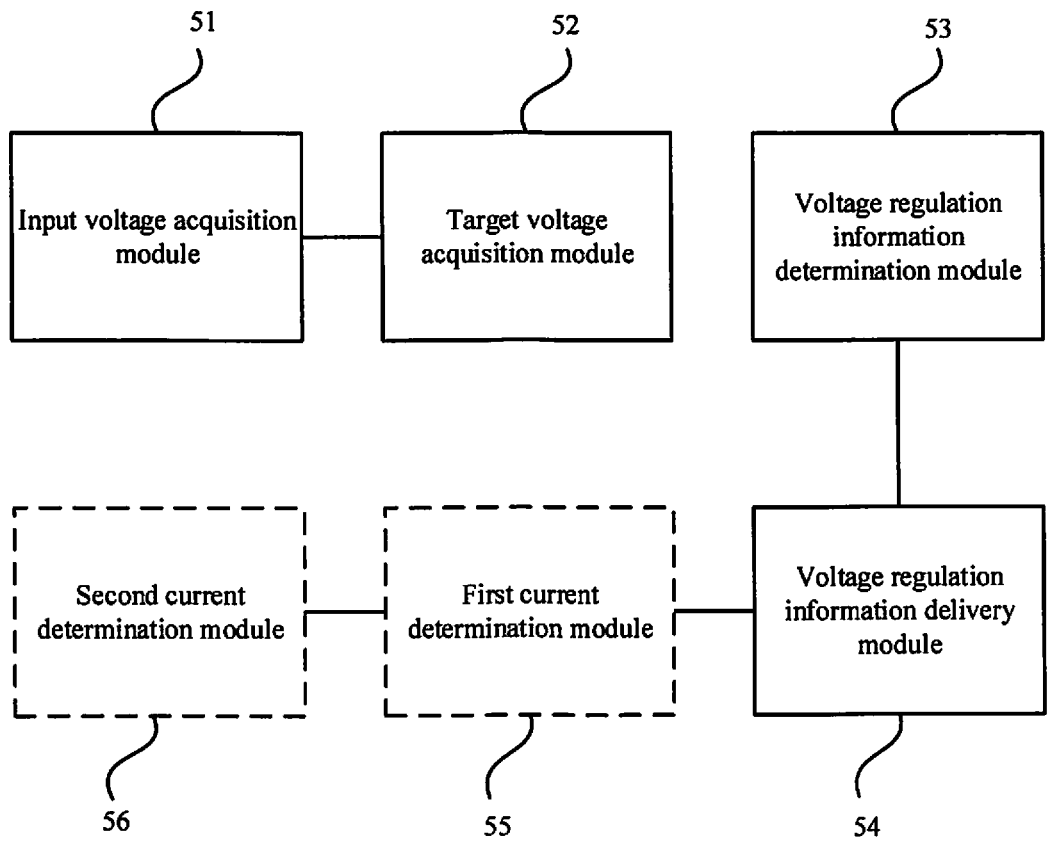
FIG. 5 is a schematic diagram of a power adaptor control device according to the fifth embodiment.

FIG. 5 is a schematic diagram of a power adaptor control device according to the fifth embodiment, this embodiment can be applicable to the control of various power adaptors, which may be implemented by software and/or hardware and may be integrated into a device that provides control functions for the power adaptor. As shown in FIG. 5, the power adaptor control device includes: an input voltage acquisition module 51, a target voltage acquisition module 52, a voltage regulation information determination module 53 and a voltage regulation information delivery module 54.

The input voltage acquisition module 51 is configured to acquire an input voltage value through a first detection terminal.

The target voltage acquisition module 52 is configured to acquire a target voltage value through a second detection terminal.

The voltage regulation information determination module 53 is configured to determine voltage regulation information according to the input voltage value and the target voltage value acquire by the target voltage acquisition module.

The voltage regulation information delivery module 54 is configured to deliver the voltage regulation information to the voltage conversion chip, so that the voltage conversion chip make the voltage value of the power output interface consistent with the target voltage value according to the voltage regulation information.

On the basis of foregoing embodiments, the target voltage acquisition module 52 is configured in the communication protocol chip to acquire the target voltage value requested by the target device through the PD protocol on the second detection terminal.

On the basis of foregoing embodiments, the power adaptor control device further includes a first current determination module 55.

The first current determination module 55 is configured to after acquiring the target voltage value requested by the target device through PD protocol, acquire a target current value requested by the target device; acquire a first current value corresponding to the target voltage value according to a preset relational table; and if the target current value is larger than the first current value, the first current value is taken as the current value requested by the target device.

On the basis of foregoing embodiments, the power adaptor control device further includes a second current determination module 56.

The second current determination module 56 is configured to after the communication protocol chip detects the connection status of the target device through the second detection terminal, and when a connection of the target device is detected by the second detection terminal, monitor the real-time output voltage value of the power output interface; if the ratio of the voltage drop of the real-time output voltage value to the target output voltage value exceeds a preset ratio threshold, acquire the current output current value and close the power supply; store the current output current value in the preset relational table, and form a new key-value pair with the target output voltage value; and send the key-value pair to the target device and start the power supply. The current output current value is the second current value.

On the basis of foregoing embodiments, the voltage regulation information delivery module 54 is configured in the voltage conversion chip to adjust the resistance value of the internal circuit of the voltage conversion chip; or, to adjust the internal circuit of the voltage conversion chip through a preset communication protocol.

The power adaptor control device provided in this embodiment, the communication protocol chip determines the voltage regulation information according to the detected target voltage value and the input voltage value, and the voltage conversion chip performs voltage conversion according to the voltage regulation information to make the voltage value of the power output interface consistent with the target voltage value, realizing that the power adaptor can supply for various electronic devices that not match with the power adaptor, thereby maximizing the utilization rate of the direct current adaptor.

The Sixth Embodiment

This embodiment provides a computer-readable storage medium, which is stored with computer-executable instructions. The computer-executable instructions are configured to perform any one of foregoing methods.

Figure 6:
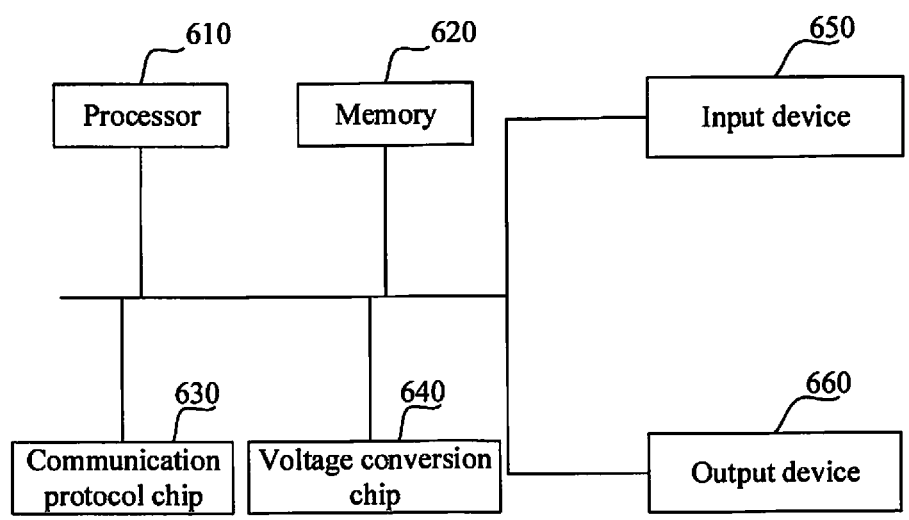
FIG. 6 is a hardware schematic diagram of a control device according to the sixth embodiment.

FIG. 6 is a hardware schematic diagram of a control device according to the sixth embodiment. As shown in FIG. 6, the control device includes one or more processors 610, a memory 620, a communication protocol chip 630 and a voltage conversion chip 640. FIG. 6 takes one processor 610 as an example.

The control device may further include an input device 650 and an output device 660.

The processor 610, the memory 620, the communication protocol chip 630, the voltage conversion chip 640, the input device 650 and the output device 660 in the control device may be connected by bus or other means. FIG. 6 takes bus connection as an example.

The memory 620, as a computer-readable storage medium, can be configured to store software programs, computer-executable instructions, and modules. The processor 610 performs multiple functional applications and data processing by running software programs, instructions, and modules stored in the memory 620 to implement any one of the power adaptor control methods according to the foregoing embodiments.

The memory 620 may include a program storing region and a data storing region, and the program storing region may store an operating system or application with at least one function. The data storing region may store data created according to the operation of control device, and the like. The memory 620 may further include non-volatile memory, such as at least one disk storage device, flash memory device, or other non-transitory solid-state storage device.

The memory 620 may be a non-transitory computer storage medium or a transitory computer storage medium. The non-transitory computer storage medium such as at least one disk storage device, flash device, or other non-volatile solid-state storage device. In some embodiments, the memory 620 includes memories remotely arranged relative to processor 610, which can be connected to the control device over the network. The foregoing network may include Internet, enterprise Intranet, local area network, mobile communication network and its combination.

The communication protocol chip 630 is configured to acquire the input voltage value and the target voltage value, and determine the voltage regulation information according to the target voltage value and the input voltage value. The voltage conversion chip 640 is configured to perform voltage conversion according to the voltage regulation information to make the voltage value of the power output interface consistent with the target voltage value.

The input device 650 is configured to receive input numeric or character information, and generates key signal inputs related to the user's configuration and functional controls. The output device 660 may further include a display panel and other display devices.

All or part of process of the methods in foregoing embodiments may be realized through the related hardware by performing the computer program. The program may be stored in a non-transitory computer-readable storage medium. when being executed, the program may include the process of the method of the foregoing embodiments. The non-transitory computer-readable storage medium may be a disk, compact disc, read-only memory (ROM) or random storage memory (RAM), and the like.

What is claimed is:

1. A power adaptor, comprising: a power input interface, a communication protocol chip, a voltage conversion chip and a power output interface; wherein
   a first detection terminal of the communication protocol chip is connected to the power input interface, a second detection terminal of the communication protocol chip is connected to the power output interface, and a control terminal of the communication protocol chip is connected to the voltage conversion chip; and
   an input terminal of the voltage conversion chip is connected to the power input interface, and an output terminal of the voltage conversion chip is connected to the power output interface;
   wherein the power adaptor further comprises a direct current adaptor, wherein an input terminal of the direct current adaptor is configured to be connected to an external power supply, and an output terminal of the direct current adaptor is configured to be connected to the power input interface; and
   wherein the communication protocol chip is configured to obtain an input voltage value through the first detection terminal of the communication protocol chip, obtain a target voltage value through the second detection terminal of the communication protocol chip, and determine voltage regulation information based on the input voltage value and the target voltage value; and
   the voltage conversion chip is configured to perform voltage conversion according to the voltage regulation information thus making a voltage value of the power output interface consistent with the target voltage value.

2. The power adaptor according to claim 1, wherein at least one of the power input interface and the power output interface is any one of the following types of interfaces: a plug or a receptacle.

3. The power adaptor according to claim 1, wherein the power output interface is a C-type universal serial bus (USB) TYPE-C interface.

4. A power adaptor control method, comprising:
   acquiring, by a communication protocol chip, an input voltage value through a first detection terminal, the input voltage value being a value of a direct current voltage;
   acquiring, by the communication protocol chip, a target voltage value through a second detection terminal;
   determining voltage regulation information, by the communication protocol chip, according to the input voltage value and the target voltage value; and
   performing, by the voltage conversion chip, voltage conversion according to the voltage regulation information so as to make a voltage value of the power output interface consistent with the target voltage value;
   the power adaptor control method further comprises:
   detecting, by the communication protocol chip, a connection status of the target device through the second detection terminal;
   in response to a connection of the target device being detected by the second detection terminal, monitoring a real-time output voltage value of the power output interface;
   acquiring a current output current value and closing the power supply, if the ratio of a voltage drop of the real-time output voltage value to the target output voltage value exceeds a preset ratio threshold;
   storing the current output current value in the preset relational table so as to form a key-value pair with the target output voltage value; and
   sending the key-value pair to the target device and starting the power supply.

5. The method according to claim 4, wherein the step of acquiring, by the communication protocol chip, the target voltage value through the second detection terminal, comprises:

acquiring, by the communication protocol chip, the target voltage value requested by a target device through the second detection terminal based on a power delivery (PD) protocol.

6. The method according to claim 5, after the step of acquiring the target voltage value requested by the target device based on the PD protocol, the method further comprising:
   acquiring a target current value requested by the target device;
   acquiring, a first current value corresponding to the target voltage value according to a preset relational table; and
   if the target current value is larger than the first current value, the first current value is taken as the current value requested by the target device.

7. The method according to claim 4, wherein the step of performing, by the voltage conversion chip, the voltage conversion according to the voltage regulation information, comprises:
   adjusting, by the voltage conversion chip, a resistance value of an internal circuit of the voltage conversion chip.

8. The method according to claim 4, wherein the step of performing, by the voltage conversion chip, the voltage conversion according to the voltage regulation information, comprises:
   adjusting, the internal circuit of the voltage conversion chip based on a preset communication protocol.

9. A non-transitory computer-readable storage medium, which stores computer-executable instructions, the computer-executable instructions are configured to perform the following steps:
   acquiring, by a communication protocol chip, an input voltage value through a first detection terminal, the input voltage value being a value of a direct current voltage;
   acquiring, by the communication protocol chip, a target voltage value through a second detection terminal;
   determining voltage regulation information, by the communication protocol chip, according to the input voltage value and the target voltage value; and
   performing, by the voltage conversion chip, voltage conversion according to the voltage regulation information so as to make a voltage value of the power output interface consistent with the target voltage value;
   wherein the computer-executable instructions are further configured to perform the following steps:

detecting, by the communication protocol chip, a connection status of the target device through the second detection terminal;
   in response to a connection of the target device being detected by the second detection terminal, monitoring a real-time output voltage value of the power output interface;
   acquiring a current output current value and closing the power supply, if the ratio of a voltage drop of the real-time output voltage value to the target output voltage value exceeds a preset ratio threshold;
   storing the current output current value in the preset relational table to form a new key-value pair with the target output voltage value; and
   sending the key-value pair to the target device and starting the power supply.

10. The non-transitory computer-readable storage medium according to claim 9, wherein the computer-executable instructions are further configured to perform the following steps:
    acquiring, by the communication protocol chip, the target voltage value requested by a target device through the second detection terminal based on a power delivery (PD) protocol.

11. The non-transitory computer-readable storage medium according to claim 10, wherein the computer-executable instructions are further configured to perform the following steps:
    acquiring a target current value requested by the target device;
    acquiring, a first current value corresponding to the target voltage value according to a preset relational table; and
    if the target current value is larger than the first current value, the first current value is taken as the current value requested by the target device.

12. The non-transitory computer-readable storage medium according to claim 9, wherein the computer-executable instructions are further configured to perform the following steps:
    adjusting, by the voltage conversion chip, a resistance value of an internal circuit of the voltage conversion chip.

13. The non-transitory computer-readable storage medium according to claim 9, wherein the computer-executable instructions are further configured to perform the following steps:
    adjusting, the internal circuit of the voltage conversion chip based on a preset communication protocol.

* * * * *